Oct. 5, 1971  H. RUHLE  3,610,127

DISTANCE ADJUSTING MEANS FOR CAMERA OBJECTIVES

Filed Feb. 12, 1970

INVENTOR
Hans Rühle by Singer, Stern & Carlberg
ATTORNEYS

United States Patent Office 3,610,127
Patented Oct. 5, 1971

3,610,127
DISTANCE ADJUSTING MEANS FOR CAMERA OBJECTIVES
Hans Ruhle, Stuttgart, Germany, assignor to Zeiss Ikon Aktiengesellschaft, Stuttgart, Germany
Filed Feb. 12, 1970, Ser. No. 10,932
Claims priority, application Germany, Feb. 22, 1969, P 19 08 913.5
Int. Cl. G03b 3/00
U.S. Cl. 95—44       5 Claims

ABSTRACT OF THE DISCLOSURE

A distance adjustment for photographic objectives employing the autocollimation principle, in which in addition to an autocollimation path of light rays a second path of light rays is used which is laterally spaced from the autocollimation path of rays and has disposed therein an adjustable optical wedge for deflecting the path of rays so that both path of rays coincide on the object to be photographed. The autocollimation rays also energize a photoelectric converter which in turn operates a servomotor for adjusting not only the optical wedge, but also the adjusting device of the camera objective in relation to the algebraic sum of two modulations produced by a rotary apertured disc in said two path of rays.

Figure 1:
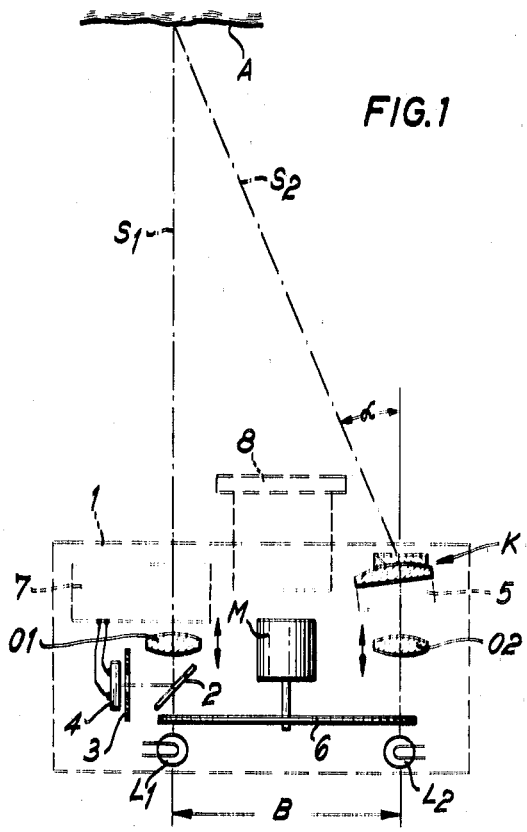

The invention relates to a distance adjusting device for the photographic objective of cameras with utilization of the autocollimation principle.

It is known to effect a sharp adjustment of a camera objective by means of a coincidence-distance meter. The present invention employs this type of sharp adjustment and automatizes it in a simple and reliable manner in that to the autocollimation path of rays is added at a certain lateral distance thereof a second path of rays, which contains outside of a source of light to be projected on the object to be photographed an adjustable deflecting system which is coupled with the adjusting means of the photographic objective of the camera, whereby the light emanating from sources of light of both paths of rays is modulable, and that a photoelectric transducer arranged in the autocollimation path of rays, if need be, with interpolation of amplifiers, controls a servomotor for the adjustment of the deflecting system and thereby controls the photographic objective in relation to the algebraic sum of both modulations.

When the two sources of light are projected unequally sharply by the objectives on the object to be photographed, the coincidence operation of the two images causes errors in the sharp adjustment of the camera objective. For overcoming this disadvantage, the present invention provides that the two objectives are coupled with one another in such manner, that they project the sources of light on the object equally sharply or equally non-sharply, respectively. When doing this, the coupling between the adjustable objectives with the adjusting devices for the deflecting system and for the photographic objective may be coupled directly or indirectly. One may, however, in place of the objectives which project the sources of light on the object employ additional axicone to the objectives, whereby in the latter case the adjustability of the two objectives may be dispensed with.

The invention will be described in the following in greater detail on the basis of an example illustrated diagrammatically in the FIGS. 1 and 2 of the accompanying drawing.

In the drawing:

According to FIG. 1, in the camera 1 indicated by the dotted lines, are arranged two laterally spaced sources of light L1 and L2, the distance between which is designated with B. The center axes of the paths of rays emanating from the sources of light are indicated by S1 or S2, respectively.

In the path of rays S1 are disposed an inclined partially permeable mirror 2 and an optical system O1. The latter projects an image of the source of light or of a mask disposed in front of the same on the object A to be photographed, while by means of the partially permeable mirror 2 the image projected on the object A is reproduced or reflected in the range of an apertured partition 3, which is optically conjugated with the source of light L1. The apertured partition 3 is disposed in front of a photoelectric transducer 4. This arrangement constitutes an autocollimation system.

In the path of rays S2 is disposed in addition to an optical system O2, which likewise serves for the projection of the source of light L2 or a mask arranged in front of the same, a pivotally mounted optical wedge arrangement K which according to its adjustment deflects the path of rays S2, as indicated by the angle $\alpha$. The adjustable carrier of the optical wedge K is indicated by the reference character 5.

The optical systems O1 and O2 are, as indicated by the double arrows, adjustable along their optical axes S1 and S2, respectively.

The paths of rays emanating from the source of light L1 and L2 may, for example, be modulated by a perforated disc 6 driven by a motor M in such manner, that upon the passage of the one path of rays, the other path of rays is blocked. Other types of modulation are possible. A useful modulation is one in which the current feeding the source of light is controlled, and also by employing gallium-arsenide diodes. When putting the device into operation and aligning the path of rays S1 on the object A to be photographed, for example by means of a view finder ray path, not shown, and which extends parallel to the path of rays S1, and when coincidence of the paths of rays S1 and S2 on the object A has not as yet been attained, an alternating current is supplied by the photoelectric transducer 4, whose frequency corresponds to the interruption of the path of rays emanating from the source of light L1 by the perforated disc 6. The transducer 4 is connected with a control device 7, which in addition to a source of current and amplifiers contains control parts for a drive motor, which adjusts the carrier 5 of the optical wedge arrangement K and also the photographic objective 8 of the camera 1. The control device is so constructed, that it responds to the alternating current impulses produced by the transducer 4 and is kept in operation. When in the course of the adjusting operation, the paths of rays S1 and S2, as shown in FIG. 1, upon corresponding adjustment of the optical wedge arrangement K coincide on the object A to be photographed, the transducer K receives upon interruption of the path of rays emanating from the path of rays S2 the image of the source of light L2 deflected from the path of rays S2 on the object A, and the transducer 4 upon corresponding selection of the modulation is for example uninterruptedly impinged by light and now supplies accordingly direct current to the control device 7, which responds on this direct current impulse by stopping the adjusting motor for the photographic objective and the optical wedge carrier 5, because then the photographic objective 8 is sharply adjusted on the object A. The optical systems O1 and O2 may, as already mentioned, be positioned in adjustable mounts which can be coupled with one another. In this way it is attained, that the images of the sources of light projected on the object possess both the same sharpness or the same lack of sharpness. When the coupling between the two optical systems O1 and O2 is connected with the adjusting device for the pivoted optical wedge carrier 5 and with the photographic objective 8, respectively, then the desired projection of the sources of light on the object A is attained, without that the projection means O1 and O2 must be adjusted separately.

Figure 2:
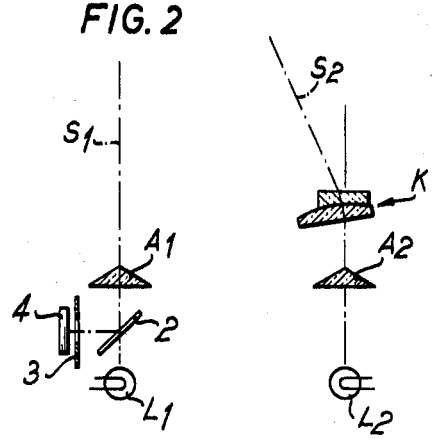

In place of the adjustable optical systems O1 and O2 or also additionally to the same, so-called Axicones A1 and A2 may be disposed in the paths of rays, as shown in FIG. 2.

The Axicones A1 and A2 comprise glass cones with center axes disposed in the axes S1 and S2. From them in any desired distance a sharp image of the source of light or of the mask arranged in front of the same is always projected. The intensity and the contrast of the projected images with respect to the surroundings are indeed somewhat lessened when compared with the images projected by the adjustable objectives, but not to an extent as having disadvantageous effect on the accuracy of the operation of the adjusting device.

Furthermore, the arrangement according to FIG. 2 is otherwise the same as that according to FIG. 1, for which reason FIG. 2 shows solely those parts essential for the illustration of the Axicones.

What I claim is:

1. Distance adjusting device for the objective of photographic cameras employing the autocollimation principle, comprising means forming an autocollimation path of rays (S1), means forming in spaced relation thereto a second path of rays (S2) including separate sources of light (L1, L2), means deflecting said second path of rays on the object to be photographed, means coupling said deflecting means for correlated movement with said photographic objective of the camera, means for modulating the light emanating from said sources of light, a photoelectric transducer arranged in the autocollimation path of rays (S1), a servomotor for positioning said deflecting means and control means for said servomotor and said photographic objective regulating the position of said deflecting means (K) and said photographic objective so that the operation of said servomotor is terminated when a continuous beam of light is sensed by said photoelectric transducer.

2. Device according to claim 1, including two adjustable objectives for projecting images of said sources of light, means for coupling said two objectives to one another in such a manner, that they project said images on the object to be photographed selectively equally sharply or equally non-sharply.

3. Device according to claim 2, in which the coupling between said adjustable objectives is connected with the adjusting means for the deflecting means.

4. Device according to claim 2, in which the coupling between said adjustable objectives is connected with the adjusting means for the photographic objective.

5. Device according to claim 1, including Axicones arranged in said two paths of rays.

References Cited

UNITED STATES PATENTS

| 2,339,780 | 1/1944 | Huitt | 95—44 |
| 3,435,744 | 4/1969 | Stimson | 95—44 |
| 3,442,193 | 5/1969 | Pagel | 95—44 |
| 3,443,502 | 5/1969 | Harvey | 95—44 |
| 3,516,742 | 6/1970 | Donitz | 95—44 |

SAMUEL S. MATTHEWS, Primary Examiner

D. J. CLEMENT, Assistant Examiner

U.S. Cl. X.R.

95—45; 356—4